United States Patent
Wu et al.

(10) Patent No.: US 11,348,047 B2
(45) Date of Patent: May 31, 2022

(54) SYSTEMS AND METHODS FOR SAFETY STOCK SETTINGS USING A PARALLEL PROCESSING COMPUTING ARCHITECTURE

(71) Applicant: Walmart Apollo, LLC, Bentonville, AR (US)

(72) Inventors: Shuohao Wu, Bentonville, AR (US); Richard Ulrich, Bentonville, AR (US); Dong Xu, San Jose, CA (US); Jingying Zhang, Beaumont, TX (US); Kunlei Lian, Bentonville, AR (US); Clifford Wayne Bolinger, Rogers, AR (US); Jackie Lei Guan, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 12 days.

(21) Appl. No.: 16/906,981

(22) Filed: Jun. 19, 2020

(65) Prior Publication Data

US 2020/0401968 A1 Dec. 24, 2020

Related U.S. Application Data

(60) Provisional application No. 62/864,175, filed on Jun. 20, 2019.

(51) Int. Cl.
*G06Q 10/06* (2012.01)
*G06Q 30/02* (2012.01)
(Continued)

(52) U.S. Cl.
CPC ......... *G06Q 10/06315* (2013.01); *G06F 9/48* (2013.01); *G06F 17/17* (2013.01);
(Continued)

(58) Field of Classification Search
CPC .......... G06F 2209/5018; G06Q 10/087; G06Q 30/0202; G06Q 20/203; G06Q 10/04; G06Q 10/06315
See application file for complete search history.

(56) References Cited

U.S. PATENT DOCUMENTS 5,765,143 A * 6/1998 Sheldon ............... G06Q 10/087
705/22
5,963,919 A * 10/1999 Brinkley ............. G06Q 10/087
705/22
(Continued)

OTHER PUBLICATIONS

Ortega, G et al. A CUDA approach to compute perishable inventory control policies using value iteration The Journal of Supercomputing, No. 16, 2018 (Year: 2018).*
(Continued)

*Primary Examiner* — Scott L Jarrett
(74) *Attorney, Agent, or Firm* — Fitch, Even, Tabin & Flannery LLP

(57) ABSTRACT

This disclosure describes a graphics processing unit programmed to generate a sample path for the demand of the one or more products at a store based at least in part on data associated with a historical distribution of the variability of the demand of the one or more products. The graphics processing unit may generate a thread corresponding to a plurality scenarios. The graphics processing unit may execute the thread in parallel to determine one or more parameters for each of the plurality of scenarios for the one or more products. The graphics processing unit may select the one or more parameters generated from the execution of one of the sample paths to minimize the cost. The graphics processing unit may adjust an inventory management system to set an inventory management setting based at least in part on the selection of the one or more parameters.

20 Claims, 8 Drawing Sheets

(51) Int. Cl.
*G06Q 10/08* (2012.01)
*G06F 9/48* (2006.01)
*G06N 7/00* (2006.01)
*G06F 17/17* (2006.01)
*G06T 1/20* (2006.01)
*G06Q 10/04* (2012.01)

(52) U.S. Cl.
CPC ............ *G06N 7/005* (2013.01); *G06Q 10/04* (2013.01); *G06Q 10/087* (2013.01); *G06Q 30/0202* (2013.01); *G06T 1/20* (2013.01)

(56) References Cited

U.S. PATENT DOCUMENTS

| | | | | |
|---|---|---|---|---|
| 6,061,691 | A * | 5/2000 | Fox | G06Q 10/087 |
| 6,609,101 | B1 * | 8/2003 | Landvater | G06Q 10/06 |
| | | | | 705/7.25 |
| 7,249,068 | B1 | 7/2007 | Kakouros | |
| 8,140,396 | B2 | 3/2012 | Suguro | |
| 8,165,914 | B2 * | 4/2012 | Bachman | G06Q 10/06315 |
| | | | | 705/7.12 |
| 8,515,834 | B2 * | 8/2013 | Henderson | G06Q 10/0637 |
| | | | | 705/28 |
| 8,600,843 | B2 * | 12/2013 | Bachman | G06Q 10/063 |
| | | | | 705/28 |
| 8,671,031 | B2 * | 3/2014 | Henderson | G06Q 10/0833 |
| | | | | 705/28 |
| 8,706,536 | B1 * | 4/2014 | McPhetrige | G06Q 30/0202 |
| | | | | 705/7.11 |
| 9,990,597 | B2 * | 6/2018 | He | G06Q 10/087 |
| 10,586,204 | B2 * | 3/2020 | Li | G06Q 30/0633 |
| 10,628,766 | B2 * | 4/2020 | Sirmokadam | G06F 11/3447 |
| 11,120,361 | B1 * | 9/2021 | Januschowski | G06N 20/00 |
| 2002/0095327 | A1 * | 7/2002 | Zumel | G06Q 30/06 |
| | | | | 705/400 |
| 2002/0147631 | A1 * | 10/2002 | Smith | G06Q 10/087 |
| | | | | 705/7.31 |
| 2003/0050817 | A1 | 3/2003 | Cargille | |
| 2003/0101107 | A1 * | 5/2003 | Agarwal | G06Q 10/087 |
| | | | | 705/28 |
| 2004/0133403 | A1 * | 7/2004 | Boedi | G06Q 10/087 |
| | | | | 702/189 |
| 2005/0234718 | A1 * | 10/2005 | Ouimet | G06Q 30/0202 |
| | | | | 704/241 |
| 2006/0026072 | A1 * | 2/2006 | Suguro | G06Q 30/0633 |
| | | | | 705/300 |
| 2006/0085299 | A1 * | 4/2006 | Goll | G06Q 10/087 |
| | | | | 705/28 |
| 2006/0161504 | A1 * | 7/2006 | Walser | G06Q 10/06 |
| | | | | 705/400 |
| 2007/0083413 | A1 * | 4/2007 | Srinivasan | G06Q 10/08 |
| | | | | 705/7.12 |
| 2008/0147477 | A1 * | 6/2008 | McCormick | G06Q 10/087 |
| | | | | 235/385 |
| 2008/0177599 | A1 * | 7/2008 | McPhetrige | G06Q 30/0202 |
| | | | | 705/7.31 |
| 2008/0228604 | A1 * | 9/2008 | Von Helmolt | G06Q 40/06 |
| | | | | 705/29 |
| 2014/0156348 | A1 * | 6/2014 | Sinkel | G06Q 10/087 |
| | | | | 705/7.31 |
| 2015/0254589 | A1 * | 9/2015 | Saxena | G06Q 10/087 |
| | | | | 705/7.25 |
| 2020/0005223 | A1 * | 1/2020 | Cook | G06Q 30/0202 |

OTHER PUBLICATIONS

Andrzejewski, Witold et al., Two-Echelon System Stochastic Optimization with R and CUDA PPAM2017, Springer, Nature, 2018 (Year: 2018).*

Oracle Inventory Optimization User Guide Release 12.2 Oracle, Apr. 2017 (Year: 2017).*

Oracle Retain Advanced Inventory Planning—Store Replenishment Planning User Guide—Release 13.0 Oracle, Jun. 2008 (Year: 2008).*

Retek Advanced Inventory Planning 11.1—User Guide—Store Replenishment Planning Retek Inc., 2004 (Year: 2004).*

Fritsch, Daniel; "6 Inventory Control Techniques for Stock Optimization"; https://www.eazystock.com/blog/2015/08/03/6-inventory-control-techniques-for-stock-optimization/?cn-reloaded=1; Aug. 3, 2015; 13 pages.

Haque, Jiaul; "Safety Stock Calculation"; https://blogs.sap.com/2014/04/10/safety-stock-calculation/; Apr. 10, 2014; 10 pages.

Saad, Sameh M. et al.; "Development of a mechanism to facilitate the safety stock planning configuration in ERP"; Production & Manufacturing Research; 2017; vol. 5, No. 1; Taylor & Francis Group; http://dx.doi.org/10.1080/21693277.2017.1322541; pp. 42-56.

Tradegecko; "Safety Stock Calculation—4 Key Points to Consider"; https://www.tradegecko.com/blog/calculating-safety-stock-levels; Oct. 1, 2018; 10 pages.

Vanguard Software Corporation; "Supply Chain Planning Solutions"; http://www.vanguardsw.com/solutions/supply-chain-planning/inventory-optimization-software/; 2018; 6 pages.

* cited by examiner

SYSTEMS AND METHODS FOR SAFETY STOCK SETTINGS USING A PARALLEL PROCESSING COMPUTING ARCHITECTURE

RELATED APPLICATIONS

This application claims priority to and the benefit of U.S. Provisional Application No. 62/864,175, filed on Jun. 20, 2020, the disclosure of which is incorporated by reference herein in its entirety.

BACKGROUND

Large multinational companies with retail stores located in different states, provinces, or countries normally receive their inventories from distribution centers located in the states, provinces, or counties where the retail stores reside. These large multinational companies determine the orders they must place with the distribution centers to replenish the inventories in the retail stores. The orders and inventory levels for items in their retail stores are based on past demand for those items.

BRIEF DESCRIPTION OF THE DRAWINGS

The accompanying drawings, which are incorporated in and constitute a part of this specification, illustrate one or more embodiments of the present disclosure and, together with the description, help to explain embodiments of the present disclosure. The drawings are not necessarily to scale, or inclusive of all elements of a system. The emphasis is instead generally being placed upon illustrating the concepts, structures, and techniques sought to be protected herein. In the drawings.

DETAILED DESCRIPTION

Figure 1:
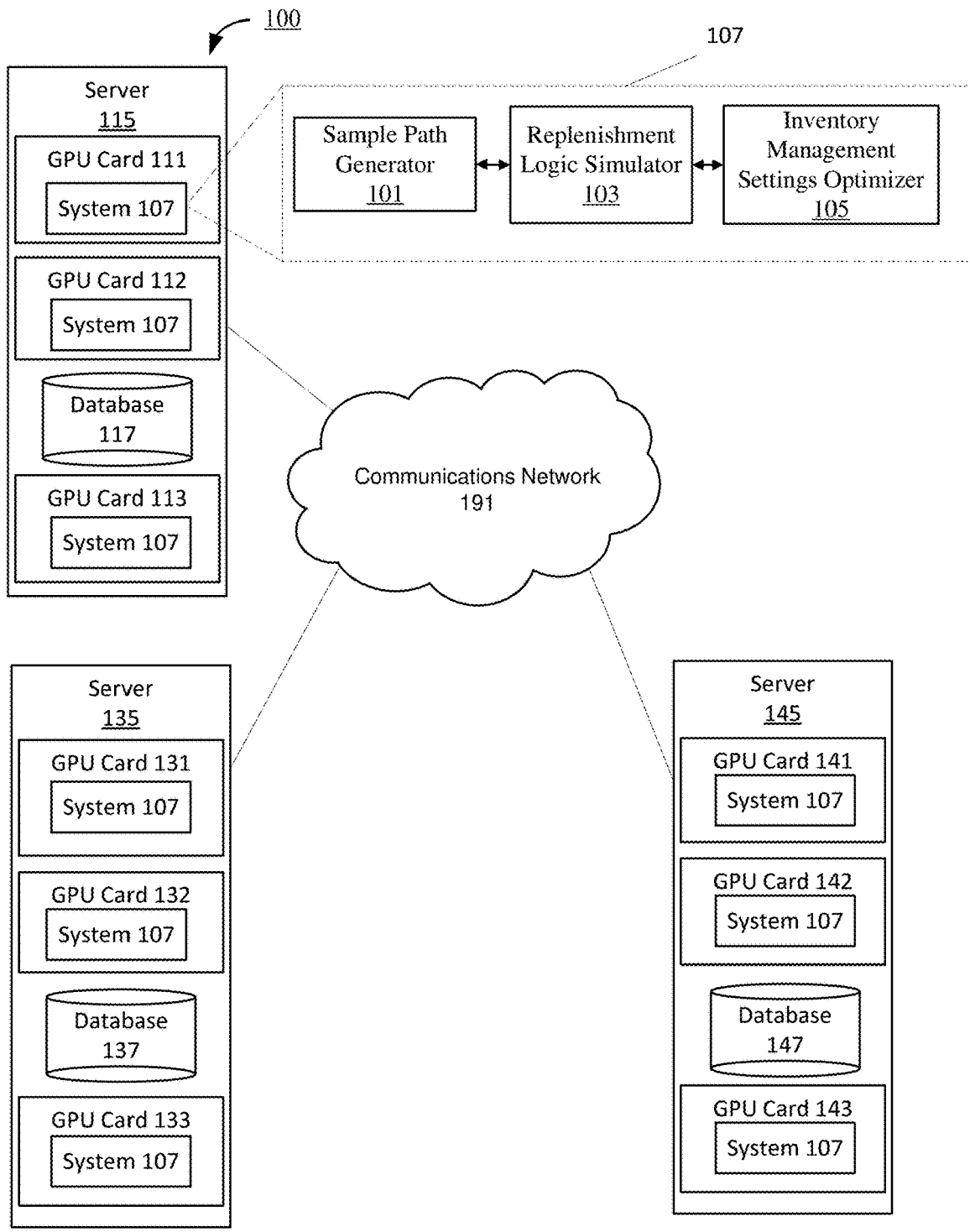
FIG. 1 is an exemplary block diagram of a data processing architecture, according to an embodiment.

Embodiments of the present disclosure implement an architecture that improves the data throughput and operational efficiency of a computational system to facility increased output of a system that processes trillions of data values. The architecture includes a computing system having a central processing unit (CPU) and a specifically programmed graphics processing unit (GPU), where the CPU hands-off the processing of the data values to the GPU and the GPU utilizes stochastic optimization techniques and multi-thread processing to increase the data throughput and operational efficiency of the computing system.

Exemplary embodiments of the present disclosure can be implemented in an inventory management system to facilitate optimized management of inventory on a store-by-store basis, at a distribution center, from a vendor, and the like. For example, embodiments of the present disclosure can facilitate changing inventory management settings in an inventory management system using one or more parameters. The inventory management settings can effect a safety stock, products facings on shelves, pack sizes, vendor pack sizes, and the like.

Embodiments of the present disclosure can be implemented to facilitate merchandise, product, or item replenishment strategies for retails stores to ensure the optimal safety stock level settings across all retail stores owned by the same company. The optimal safety stock level settings can be based at least in part on reducing the total inventory cost to keep the appropriate inventory level for each item at each individual store while not affecting the total sales. Replenishment strategies can optimize the safety stock levels for each item in a store across all stores owned by the same company which corresponds to having an adequate amount of inventory available to service the demand of customers at those stores, while minimizing the total cost to provide the necessary inventory levels.

Normally replenishment strategies do not optimize safety stock level setting on a per item basis for each given store, which oftentimes can lead to an inefficiency of inventory for certain items and an overabundance of inventory for other items. This could have far reaching effects on not only the cost of doing business (e.g., lost sales due to an insufficient inventory to meet the demand of customers) but also on the environment because subsequent orders may be needed to meet the inventory needs for a given store thereby requiring additional transportation to delivery the items. These issues exist because current forecasting methods typically do not measure the demands of individual items at a given store over a period of time, and combine the demands from each individual store to predict the supply needed to meet the demand of all of the stores.

One potential way to address this complex issue is to construct a processing framework that leverages stochastic optimization techniques to minimize the total cost and solve for the associated optimal safety stock settings. The stochastic optimization techniques are built on the randomness that comes from a variance in the demand for each item at each store in each day. The stochastic optimization techniques may be based at least in part on a daily demand distribution. To this end a Monte Carlo Simulation-based optimization model is implemented in hardware as a multicore graphics processing unit (GPU) to replicate a global replenishment system process based on historical data. The GPU is constructed with the flexibility to fine tune a comprehensive list of input parameters that may impact safety stock values. Because the stochastic optimization technique is implemented in hardware, the GPU leverages the computation efficiency of the multicore GPUs to significantly increase visibility into the demand for each item across all stores, while minimizing the amount of time to perform the computations.

Because demand does change throughout the year, across methods of the year (seasons), and weeks, the stochastic optimization techniques take seasonality into consideration. In most safety stock replenishment strategies a fixed demand distribution is assumed, which can lead to inaccuracies in the forecast for the demand of items across different stores. As a result, the total cost to the company of the stores may be higher than it should be in order to meet the demand for the items in the different stores, or may lead to lost sales because not enough inventory is available to meet the demand for the items in the different stores. In some embodiments the stochastic optimization techniques may be based on a specified demand forecast (e.g., 13 weeks) at a daily level, which covers seasonality in both short term and long term. For example, the stochastic optimization techniques are based at least in part on annual seasonal effects on demand (e.g., back-to-school, Easter, Thanksgiving) and intra-week seasonality to determine what the demand for certain items might be on the weekend.

Based on the stochastic optimization techniques the GPU and the forecast of the demand for different items across stores, the GPU can also generate a holistic cost function that factors in inventory capital opportunity cost, inventory handling labor cost, and lost sales cost.

Normally the stochastic optimization techniques are implemented in computers that do not have multiple cores with multithreading capabilities. As a result these computers may require upwards of an entire year to execute the stochastic optimization techniques disclosed herein for a three different store/items per second. A store/item is a unique combination of a particular item in a particular store. The GPU was specifically programmed to implement the stochastic optimization techniques disclosed herein, thereby enabling the GPU to determine the demand and cost to ensure there is adequate inventory for a given item to meet the demand, for thousands of store/items (e.g., approximately 2000 stores) in one second. That is, the specifically programmed GPU is capable of forecasting the demand and inventory and labor cost associated with an inventory supply that meets the forecasted demand for a given item across thousands of stores in a given second. That corresponds to a 15 order of magnitude increase in speed over conventional techniques using central processing unit (CPU) used in a computer.

In accordance with embodiments, a system for determining and adjusting a safety stock setting is disclosed. The system includes a database storing a history of a variability of a demand for one or more products at a store. The system also includes a central processing unit programmed to receive data associated with a historical distribution of a variability of a demand for one or more products at a store; and submit the data associated with the historical distribution of the variability of the demand to a graphics processing unit. The system's graphics processing unit is programmed to generate a sample path for the demand of the one or more products at the store based at least in part on the data associated with the historical distribution of the variability of the demand of the one or more products. The sample path includes a plurality of scenarios based on a negative binomial distribution associated with the data. The system's graphics processing unit is further programmed to generate a thread corresponding to each of the scenarios. The system's graphics processing unit is further configured to execute each thread in parallel to determine one or more parameters for each of the plurality of scenarios for the one or more products, select the one or more parameters generated from the execution of one of the sample paths to minimize the cost, and adjust an inventory management system to set a safety stock setting based at least in part on the selection of the one or more parameters.

In accordance with embodiments, a method for determining a safety stock setting for one or more products is disclosed, including receiving data associated with a historical distribution of a variability of a demand for one or more products at a store via a central processing unit. The method further includes submitting the data associated with a historical distribution of a variability of a demand to a graphics processing unit. The method further includes generating a sample path for the demand of the one or more products at the store by the graphics processing unit based at least in part on the data associated with the historical distribution of the variability of the demand of the one or more products. The sample path comprises a plurality of scenarios based on a negative binomial distribution associated with the data. The method further includes generating, via the graphics processing unit, a thread corresponding to each of the scenarios. The method further includes executing, via the graphics processing unit, each thread in parallel to determine one or more parameters associated with the one or more products for each of the plurality of scenarios. The method further includes selecting the one or more parameters generated from the execution of one of the sample paths to minimize the cost. The method further includes adjusting an inventory management system to set a safety stock setting based at least in part on the selection of the one or more parameters.

FIG. 1 is an exemplary block diagram of a data processing architecture, according to an embodiment. Network environment 100 comprises servers 115, 135, and 145. Server 115 may comprise GPU card 111, GPU Card 112, GPU Card, 113 and Database 117. Server 135 may comprise GPU card 131, GPU Card 132, GPU Card, 133 and Database 137. Server 145 may comprise GPU card 141, GPU Card 142, GPU Card, 143 and Database 147. Server 115, server 135, and server 145 may be connected via a wide area network (WAN) where servers 115, 135, and 145 may be located on different continents. That is, the servers (server 115, server 135, and server 145) may be a part of an enterprise network managed by a company that manages a set of stores. GPU Cards 111, 112, 113, 131, 132, 133, 141, 142, and 143 may be implemented as graphics processing unit (GPU) 694. The databases 117, 137, and 147 can store data including housing data associated with the cost to purchase a certain amount of inventory, and data about the count or amount of inventory available and the amount of inventory stores have required in the past to cover demand. The data processing architecture may be implemented by the specifically programmed GPU(s) described above. One or more of the specifically programmed GPU(s) in the GPU cards 111, 112, 113, 131, 132, 133, 141, 142, and 143 may be programmed to implement an instance of a system 107 or a portion of an instance of the system 107. The system 107 can include a sample path generator 101, a replenishment logic simulator 103, and an inventory management setting optimizer 105. The sample path generator 101 may generate a forecast for the demand for items in a set of stores for a specified time period (e.g., at least a thirteen day period). The sample path generator 101 may be implemented using the specifically programmed GPU. In particular, the architecture of the specifically programmed GPU may be designed to execute one or more instructions that cause the specifically programmed GPU to generate sample paths using one or more processes. The sample path generator may also be generated by the specifically programmed GPU using a plurality of threads. For example, the specifically programmed GPU may execute instructions to generate a forecast for the demand for a first set of items, a forecast for the demand of a second set of items, etc., using a different process for each of the forecasts. Thus parallel processing can be used to generate the sample path. Similarly threads may be used in much the same way to generate the sample path where a single thread may be used to generate a forecast for the demand of a set of items. The set of items may be for instance a bag of peas. A multitude of sample paths can be generated for an item and each generated sample path can be processed via the GPU. The replenishment logic simulator 103 may determine orders, inventory levels, and associated costs based on the forecast. The replenishment logic simulator 103 may be implemented by the specifically programmed GPU using one or more parallel processes. For example, the specifically programmed GPU may determine orders for one or more first items using a first process, determine orders for one or more second items using a second process etc. Thus parallel processing can be used to determine orders. Similarly threads may be used in much the same way to determine the orders where a single thread may be used to determine the orders for the one or more first items. The inventory levels and associated cost may also be determined in the same way. The inventory management settings optimizer 105 can determine the best inventory management setting (e.g., safety stock setting, pack size setting, product facing setting, etc.) by minimizing the total potential coast from a profit and loss perspective across the stores in the set. The inventory management settings optimizer 105 may be implemented by the specifically programmed GPU using one or more processes or threads. For example, the specifically programmed GPU may minimize the total potential cost for one or more first items across all stores using a first process, minimize the total potential cost for one or more second items across all stores using a second process, etc. The specifically programmed GPU may execute one or more threads, where each of the threads may minimize the total potential cost for one or more items across all of the stores. The sample path generator 101 and replenishment logic simulator 103 may both interface directly with a database 117 housing data associated with the cost to purchase a certain amount of inventory, and data about the count or amount of inventory available and the amount of inventory stores have required in the past to cover demand.

Figure 2:
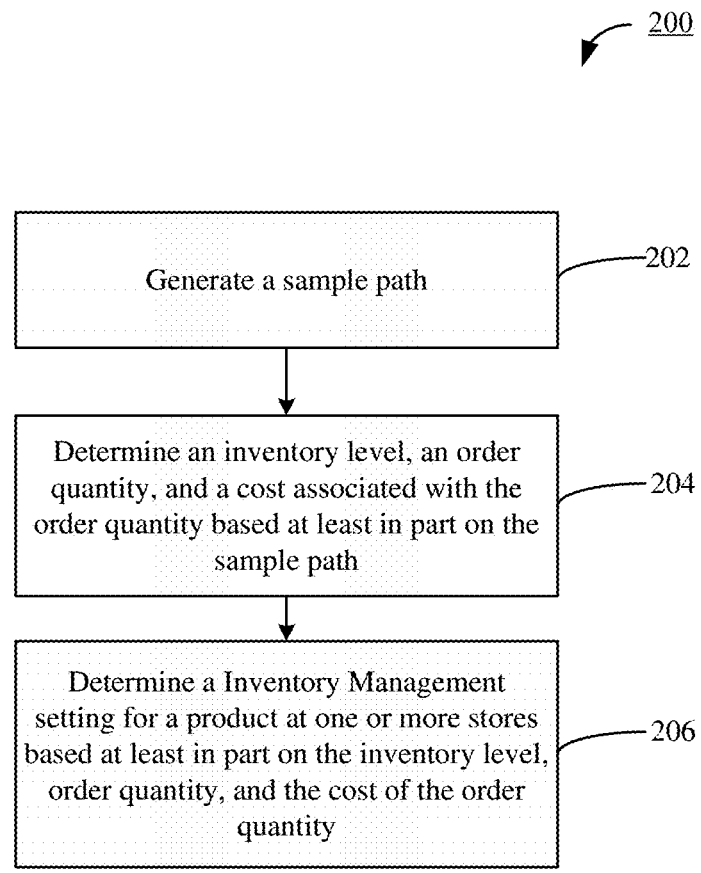
FIG. 2 is an exemplary flow diagram for determining an inventory management setting for a product at a store, according to an embodiment.

FIG. 2 is an exemplary flow diagram for determining an inventory management setting, e.g., a safety stock setting, for an item at a store, according to an embodiment. At block 202, the one or more GPUs may execute computer executable instructions to generate a sample path in accordance with the one or more blocks in FIG. 3. The sample path may be a stochastic demand for an item. That is the sample path can be a forecast of the demand for the item where the forecast is based on past demand across one or more stores. Because the demand across the stores on a given day varies the variation is what gives rise to the demand being stochastic. After the one or more GPUs generate the sample path, the one or more GPUs may determine an inventory level of the item, an order quantity of the item, and a cost associated with the order quantity based at least in part of the sample path (block 204). Because future customer demand is not deterministic (the demand is stochastic), the system described herein must closely predict what the future customer demand is in order to accurately determine the inventory level for the item, the order quantity for the item, and the cost associated with the order quantity. For a given store, there may be several thousand items for which sample paths must be determined. A parallel process may be executed by the specifically programmed GPU to determine the sample path demand for each of the several thousands of items across all of the stores. The parallel process may also be used to determine the inventory level, order quantity, for all items across all stores. The one or more GPUs may execute computer-executable instructions that cause the one or more GPUs to determine a count, quantity, or amount of the item that should be ordered based on the sample path, or more specifically the forecast associated with the sample path. For example, the one or more GPUs may determine that a certain number of bags of frozen peas should be ordered based on the forecast for the day which is based on the distribution of the demand from prior years. The one or more GPUs may execute computer executable instructions that may cause the one or more GPUs to a count, quantity, or amount of the item that should be held in inventory. For example, the one or more GPUs may determine that a certain number of bags of frozen peas should be ordered based on the forecast for the day which is based on the distribution on the demand from prior years. The one or more GPUs may determine the total cost to order the determined quantity by multiplying the per unit cost for a bag of frozen peas by the number of bags of frozen peas corresponding to the order quantity. In some embodiments the per unit cost may be based on a grouping of a predetermined number of the item. For example, the per unit cost is the cost for a package of a certain number of bags of frozen peas.

After the one or more GPUs determine the inventory level, order quantity, and cost associated with the product, the one or more GPUs may execute computer executable instructions that cause the one or more GPUs to determine a safety stock setting for the item at the store based at least in part on the inventory level, order quantity, and the cost of the order quantity (block 206).

In some embodiments, the inventory management setting for the item can be the size of a package that includes a certain amount of an item. In some embodiments, the pack size, or package size, may be the size of a package containing a certain number of an item (e.g., a certain number of bags of frozen peas in the pack). For example, the package size can be based at least in part on the number of the item that can be included in the package.

In other embodiments, the inventory management setting for the item can be a certain number of an item in a particular store facing. The number of the item in the particular store facing, can be defined as the number of a certain item on a shelf facing outward toward the center of an aisle of a retail store. For instance, the number of cans of peas on a shelf can be the number associated with the store facing.

The instructions corresponding to blocks 202-206 may be executed by the one or more GPUs for each item at each store in a set of stores using parallel, multi-threaded processing.

Figure 3:
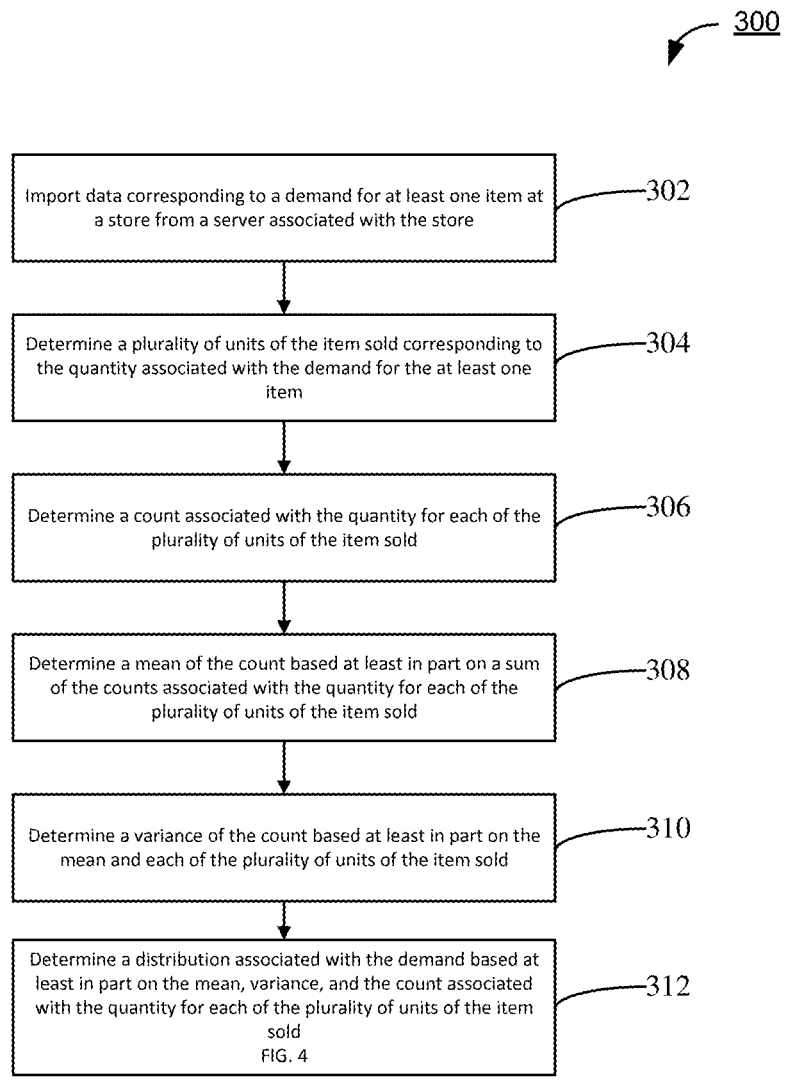
FIG. 3 is an exemplary flow diagram for generating a sample path, according to an embodiment.

FIG. 3 is an exemplary flow diagram for generating a sample path, according to an embodiment. The one or more GPUs may execute computer executable instructions that cause the one or more GPUs to import data corresponding to a demand for the item at the store from a server associated with the store (block 302). The demand may be historical demand for the item at the store over one or more prior years. Returning to the example above the quantity associated with the demand may be for a bag of frozen peas on a given day in the year. In some embodiments the historical demand may be the historical demand of a plurality of consecutive days (e.g., the historical demand for the days of the weekend (Saturday and Sunday)). The historical demand for the frozen bag of peas may be an average demand for that day across the one or more previous years.

After the one or more GPUs import the data, the one or more GPUs may execute computer executable instructions that cause the one or more GPUs to determine a plurality of units of the item sold from the imported data (block 304).

For instance the data may comprise information about the number of units in which the item may be sold. Returning to the example above, the bag of frozen peas may be sold single units, units of two bags, units for three bags, etc. The one or more GPUs may determine, from the imported data, all of the number of units in which the item was purchased at the store. The one or more GPUs may execute computer executable instructions that cause the one or more GPUs to determine a count of the plurality of units of the item sold (block 306). For instance, the item might have been sold in single units a first number of times, for the day, sold in units of two a second number of times for the day, said in units of three a third number of times etc. Returning to the bag of frozen peas example, the one or more GPUs may determine from the data that single units of bags of frozen peas were sold ten times, bags of frozen peas were sold in units of four fourteen times, etc. The one or more GPUs can determine the number of times an item is sold as a certain number of units for the plurality of different units at which the items was sold.

After the one or more GPUs determine the count of the plurality of units of the item, the one or more GPUs may execute computer executable instructions that cause the one or more GPUs to determine a mean of the count based at least in part on a sum of the counts associated with the plurality of units of the item sold (block 308). For instance, the one or more GPUs may determine a product of the count of the item sold in single units and the number of single units sold. The one or more GPUs may determine a product of the count of the item sold in units of two, and the number of units of the item sold in twos. The one or more GPUs may determine a product of the count of the item sold in units of three and the number of units of the item sold in threes etc. The one or more GPUs may determine products for each of the units in which the item can be sold, and the count of the units for the plurality of units at which the item was sold. The one or more GPUs may then execute computer executable instructions that cause the one or more GPUs to add the products and divide the resulting products by the number of products, to determine the mean. This relationship may be expressed symbolically in the following way. The number of units in which the item can be sold may be represented as i and the count associated with the number of times the number of units in which the item can be sold may be represented as $p_i$. The number of units in which the item can be sold is a non-negative number. The mean may be expressed symbolically as $$\mu = \frac{\sum_{i=1}^{n} i \times p_i}{n},$$

and the value for n maybe any positive integer representing the plurality of the units in which the item can be sold. For instance, if the item can be sold in six different units (i.e., single units, units of tow, units of three, units of four, units of five, and units of six), then n=6.

The one or more GPUs may determine a variance of the count based at least in part on the mean and each of the plurality of units of the item sold (block 310). The one or more GPUs may execute computer executable instructions that cause the one or more GPUs to determine a difference between each of the plurality of units of the item sold and the mean (i.e., (i-μ), for i=1 ... n). The one or more GPUs may square the difference (i.e., $(i-\mu)^2$, for i=1 n), sum the squared values (i.e., $\Sigma_{i=1}^{n}(i-\mu)^2$) and divide the resulting sum by the plurality of units in which the item can be sold $$\left(i.e., \frac{\sum_{i=1}^{n}(i-\mu)^2}{n}\right).$$

The resulting value is the variance of the count associated with the plurality of units of the item sold.

After the one or more GPUs determine the mean and the variance of the count associated with the plurality of units of the item sold, the one or more GPUs may execute computer executable instructions to determine a distribution associated with the demand based at least in part on the mean, variance, and count associated with the quantity for each of the plurality of units of the item sold for each of the plurality of units of the item sold (block 312). The one or more GPUs may execute computer executable instructions according to FIG. 4, to determine the distribution. In some embodiments, the one or more GPUs may determine that the distribution is different for different days in a year. For instance, the one or more GPUs may determine that the distribution associated with the demand for an item on a first day corresponds to a first distribution, and may determine that the distribution associated with the demand for the item on a second day corresponds to a second distribution. Returning to the example above, the one or more GPUs may determine that the distribution associated with the demand for a bag of frozen peas on a given day in the month of March is not the same as the distribution associated with the demand for the same bag of frozen peas on another given day in March, or another day not in the month of March. Accordingly, the values generated in the sample path may be based on one or more different distributions. Also it should be noted that the one or more GPUs may generate values in the sample path that correspond to the same distribution, but have different values for the mean, variance, and/or other statistical parameters associated with the same distribution. For instance, the distribution associated with the demand used to generate values on a first day in the ample path may have a first mean and first variance, and the distribution associated with the demand used to generate values on a second day in the sample path may have a second mean and second variance.

Figure 4:
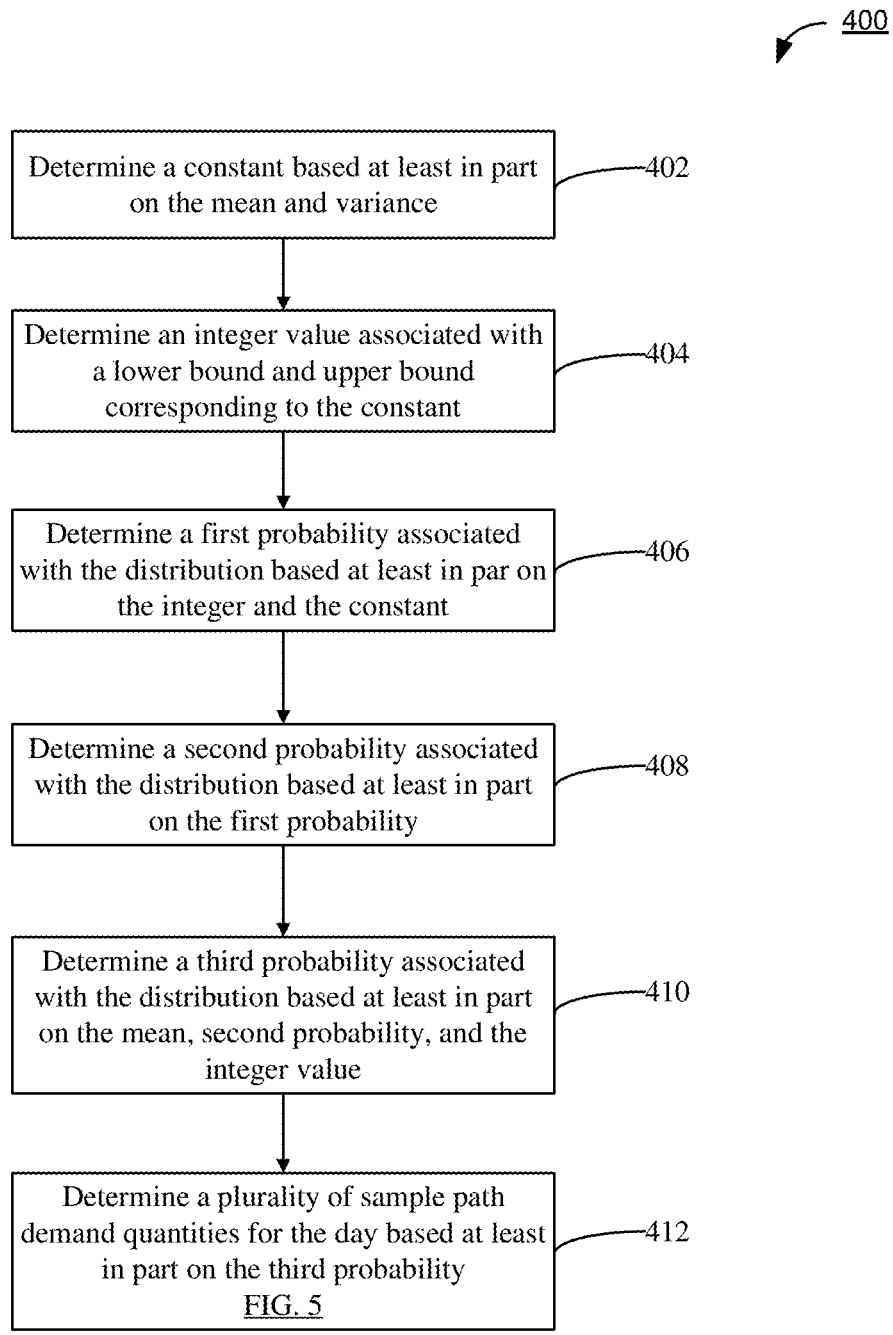
FIG. 4 is an exemplary flow diagram for determining a distribution associated with a sample path, according to an embodiment.

FIG. 4 is an exemplary flow diagram for generating a distribution associated with the sample path, according to an embodiment. The one or more GPUs may execute computer executable instructions that cause the one or more GPUs to generate the values of the sample path based on the generation of a random variable. The random variable may be generated based at least in part on the noise generated by one or more electronics in the GPU, or the randomness associated with the execution of the one or more processes or threads by the one or more GPUs. In order to generate the random variable the one or more GPUs may execute computer executable instructions to determine a constant based at least in part on the mean of the distribution determined by the one or more GPUs in block 308 and the variance of the distribution in block 310 (block 402). For instance the constant may be equal to the difference between a coefficient of variation and the inverse of the mean. For example, the constant may be symbolically represented as, $$a = c^2 - \frac{1}{\mu},$$

where $c^2$ is me coefficient of variation of the distribution and $\mu$ is the mean of the distribution. The coefficient of variance may be the variance of the distribution normalized by the square of the mean. That is $$\frac{c^2}{\mu^2},$$

where $\sigma^2 = \Sigma_{i=1}^{n}(i-\mu)^2$ is the variance of the distribution, and $\mu^2$ is the square of the mean $$\text{(i.e., } \mu^2 = \left(\frac{1}{n}\sum_{i=1}^{n} p_i\right)^2.$$

The one or more GPUs may execute computer executable instructions that cause the one or more GPUs to determine a non-negative integer associated with a lower bound and an upper bound corresponding to the constant (block 404). The non-negative integer is the number of units in which the item can be sold in block 308. The constant is bounded below by the inverse of the sum of the non-negative integer. That is the lower bound may be expressed symbolically as $$\frac{1}{i+1}.$$

The constant is bounded above by the inverse of the non-negative integer. That is the upper bound may be expressed as $$\frac{1}{i}.$$

Accordingly the non-negative integer is determined based at least in part on the constant being bounded above and below according to the expressions $$\frac{1}{i+1} \text{ and } \frac{1}{i}.$$

Thus the value for i is determined based at least in part on $$\frac{1}{i+1} \text{ and } \frac{1}{i}.$$

For instance, the constant a is bounded above and below symbolically as $$\frac{1}{i+1} \leq a \leq \frac{1}{i} \text{ for } i = 1, 2,$$

. . . After the one or more GPUs determine the non-negative integer that bounds the constant below and above, the one or more GPUs execute computer executable instructions that cause the one or more GPUs to determine a first probability associated with the distribution based at least in part on the integer and the constant (block 406). The first probability may be the probability with which the random variable will be equal to a certain value. For instance the first probability may be the probability that the random variable will be equal to a certain demand on a given day. Returning to the example of the bag of frozen peas, the random variable corresponds to a number of units in which the item can be sold (i.e., the variable i). The first probability may be equal to, for example, 60% when the random variable is equal to a value of 1 which corresponds to the frozen bag of peas being sold in single units. The first probability may be equal to another value when the random variable is equal to another number of units in which the frozen bag of peas is sold. For example, the first probability may be equal to a value of 5% when the random variable is equal to a number of units sold being equal to 20.

The one or more GPUs may execute computer executable instructions to determine a second probability (block 408). The first probability may be expressed symbolically as q and the second probability may be expressed as symbolically as 1-q. The first probability may be expressed symbolically as $$q = \frac{(1+i)a - \sqrt{(1+i)(1-ai)}}{1+a}.$$

The first probability corresponds to the probability in which the random variable may be equal to a number of units in which the item is sold when the random variable is based at least in part on i and a third probability as discussed below. The second probability corresponds to the probability in which the random variable may be equal to a number of units in which the item is sold when the random variable is based at least in part on i+1 and the third probability.

The one or more GPUs may execute computer executable instructions that cause the one or more GPUs to determine a third probability associated with the distribution based at least in part on the mean, the second probability, and the integer value (block 410). The third probability may be depicted symbolically as p. The third probability may be expressed in terms of the mean, second probability, and the integer as $$p = \frac{\mu}{i+1-q+\mu}.$$

After the one or more GPUs determine the third probability, the one or more GPUs may execute computer executable instructions that cause the one or more GPUs to determine a plurality of sample path demand quantities for the day based at least in part on the third probability (block 412). The one or more GPUs may execute instructions corresponding to the block in FIG. 5 to generate one or more random variables that may be used to construct the sample path.

Figure 5:
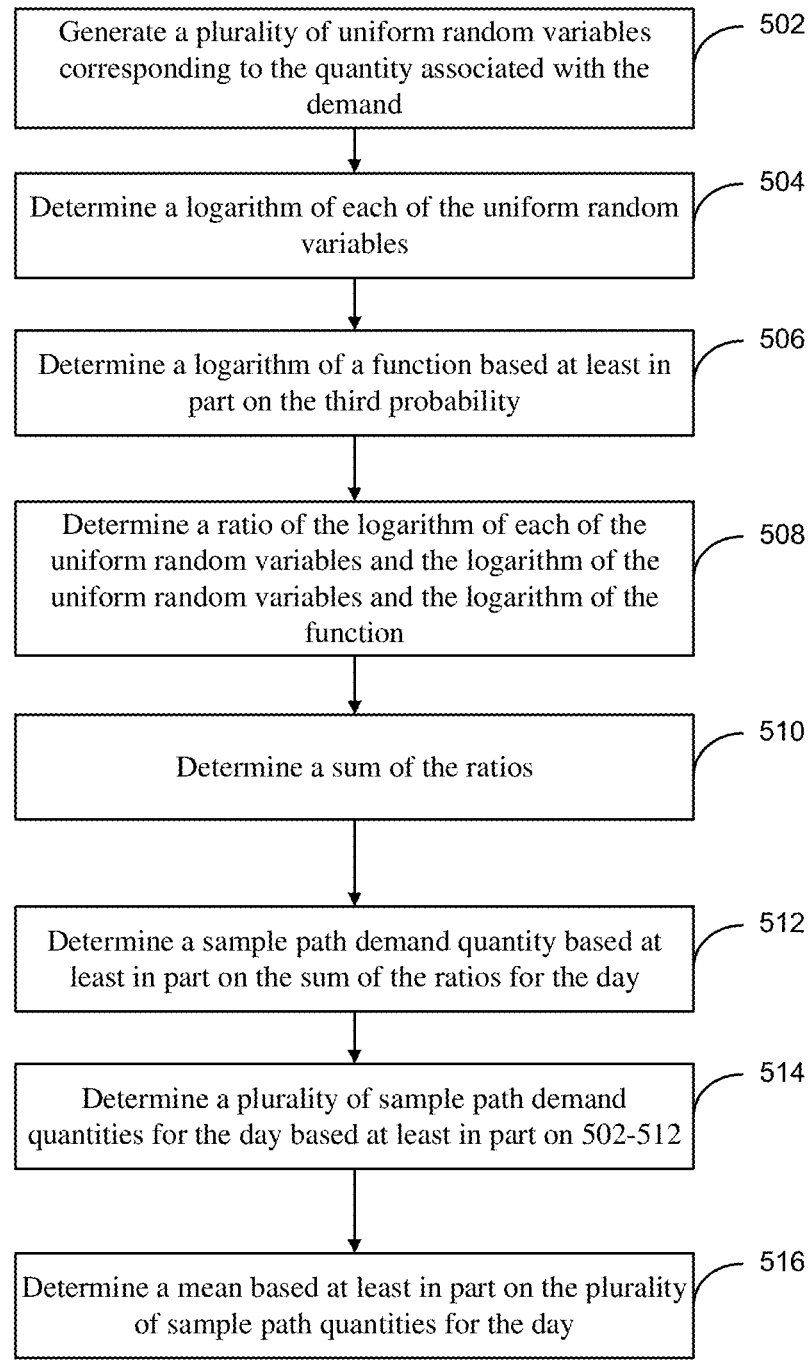
FIG. 5 is an exemplary flow diagram for generating random variables associated with a sample path, according to an embodiment.

FIG. 5 is an exemplary flow diagram for generating random variables associated with a sample path, according to an embodiment. The one or more GPUs may generate the sample path by generating a plurality of uniform random variables corresponding to the quantity associated with the demand (block 502). The uniform random variable may be any real number selected in the open set (0,1). That is, the uniform random variable may be any real number between 0 and 1 not inclusive of 0 and 1. The one or more GPUs may generate the uniform random variable based on a random seed stored in the GPU. The random seed may change based at least in part on the noise produced by the electronics in the GPU in response to the electronics switching, or drawing electricity at random intervals of time. Accordingly, at a first time the electronics, including the one or more GPUs, may generate a first noise profile that may be quantified as a first instance of the random see, and the one or more GPUs may generate a number in the open set (0,1) based on the first noise profile at the first time. At a second time the electronics, including the one or more GPUs, may generate a second noise profile that may be quantified as a second instance of the random seed, and the one or more GPUs may generate a number in the open set (0,1) based on the second noise profile at the second time. The one or more GPUs may execute computer executable instructions that cause the one or more GPUs to determine a logarithm of each of the random variables (block 504). The uniform random variables may be expressed symbolically as $U_1 \ldots U_m$, where $m=1, 2, \ldots$. The natural logarithm of the uniform random variables may be expressed symbolically as $\ln(U_1 \ldots U_m) = \ln(U_1) \ldots \ln(U_M)$. After the one or more GPUs determine the logarithm of each of the uniform random variables, the one or more GPUs may execute computer executable instructions that cause the one or more GPUs to determine a logarithm of a function that is based at least in part on the third probability (block 506). In some embodiments, the function may be equal to 1-p, where p is the third probability. Thus the one or more GPUs may determine the natural logarithm of (1-p) which may be expressed symbolically as $\ln(1-p)$. The one or more GPUs may determine a ratio of the natural logarithm of each of the uniform random variables and the natural logarithm of the function (block 508). This may be expressed symbolically as $$\frac{\ln(U_1)}{p} \ldots \frac{\ln(U_m)}{p}.$$

The one or more GPUs may then determine a sum of the ratios at block 510, which may be expressed symbolically as $$\sum_{j=1}^{m} \frac{\ln(u_j)}{p}.$$

The one or more GPUs may determine the sample path demand quantity based at least in part on the sum of the ratios for a given day (block 512). Returning to the example of the bag of frozen peas, the sample path demand quantity is the random variable mentioned above that corresponds to the number of units in which the item can be sold. So the sample path demand quantity may be a realization of a random variable that may be equal to, for example, 20 units of frozen bag of peas, based on the sum of the ratio of the uniform random variables and the third probability. In some embodiments the random variable corresponding to the sample path demand quantity may have a negative binomial distribution.

The one or more GPUs may execute computer executable instructions, corresponding to block 514, that cause the one or more GPUs to generate a plurality of sample path demand quantities for a given calendar day based on blocks 502-512. For instance the one or more GPUs may determine a first sample path demand quantity based on a first iteration of blocks 502-512, determine a second sample path demand quantity based on a second iteration of blocks 502-512, determine a third sample path demand quantity based on a third iteration of blocks 502-512, etc. Based at least in part on the plurality of sample path demand quantities, the one or more GPUs may execute computer executable instructions to determine the mean of the plurality of sample path demand quantities for the day (block 516).

Figure 6:
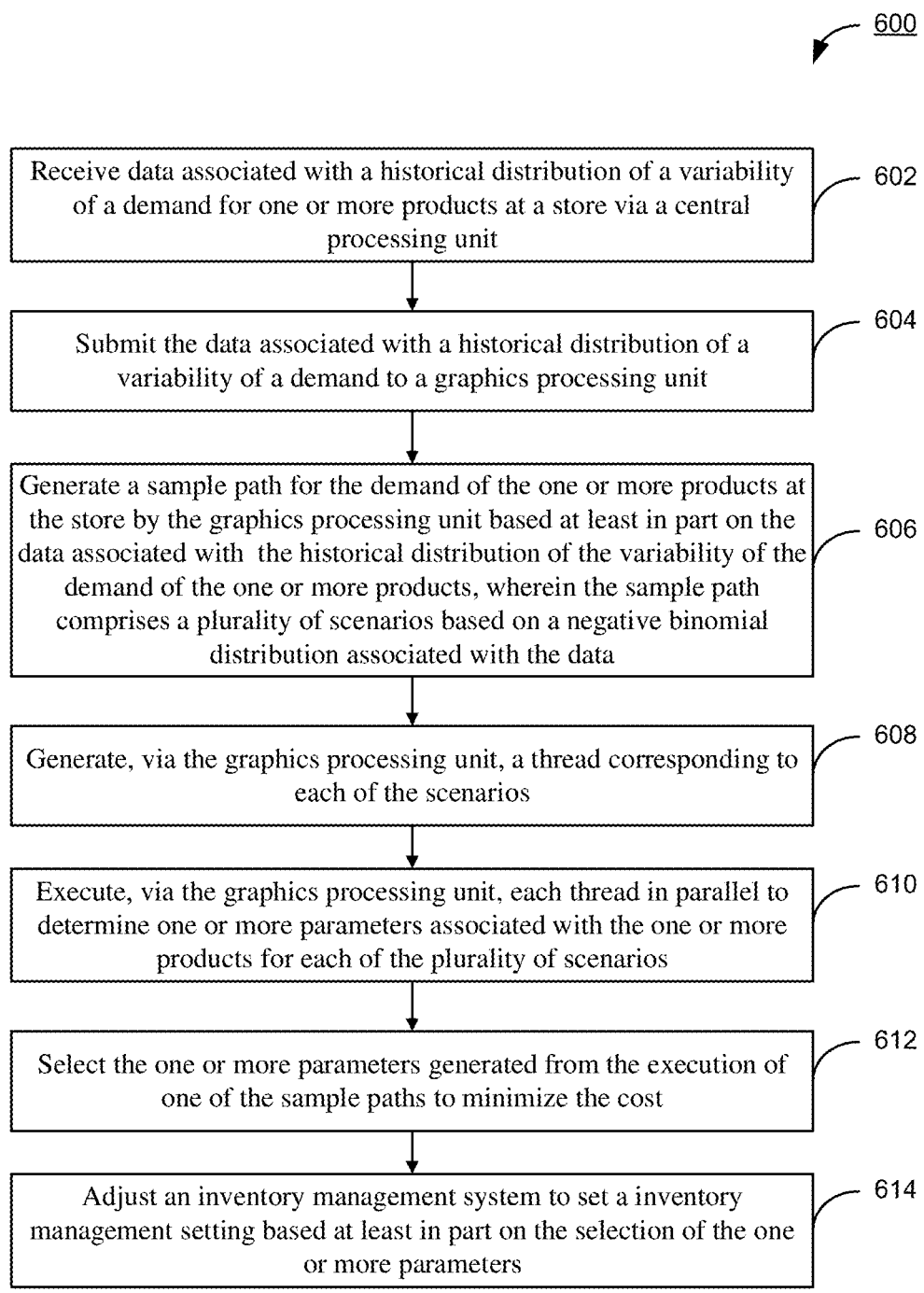
FIG. 6 is an exemplary flow diagram for adjusting an inventory management system, according to an embodiment.

FIG. 6 is an exemplary flow diagram for adjusting an inventory management system, according to an embodiment. Method 600 may be a method for adjusting an inventory management system. At block 602, the method may receive data associated with a historical distribution of a variability of a demand for one or more products at a store via a central processing unit. At block 604, the method may submit the data associated with a historical distribution of a variability of a demand to a specifically programmed GPU. At block 606, the method may generate a sample path for the demand of the one or more products at the store by the specifically programmed GPU based at least in part on the data associated with the historical distribution of the variability of the demand of the one or more products, wherein the sample path comprises a plurality of scenarios based on a negative binomial distribution associated with the data. At block 608, the method may generate, via the specifically programmed GPU, a thread corresponding to each of the scenarios. At block 610, the method may execute, specifically programmed GPU, each thread in parallel to determine one or more parameters associated with the one or more products for each of the plurality of scenarios. At block 612, the method may select the one or more parameters generated from the execution of one of the sample paths to minimize the cost. At block 614, the method may adjust an inventory management system to set an inventory management setting based at least in part on the selection of the one or more parameters.

Figure 7:
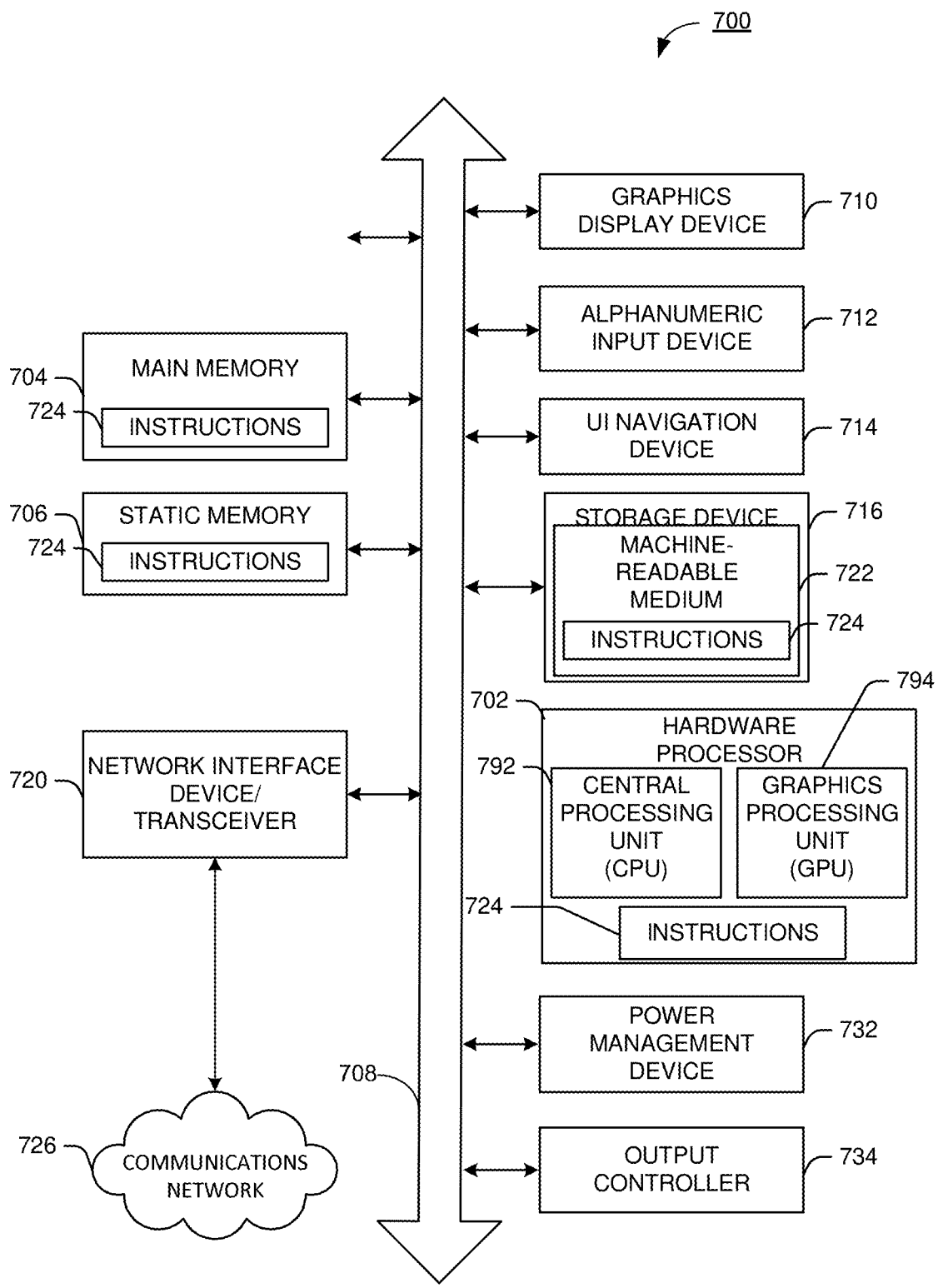
FIG. 7 is an exemplary block diagram of a computing device that may be used to implement the exemplary embodiments disclosed herein.

FIG. 7 illustrates a block diagram of an example of a machine or computing device 700 upon which any one or more of the techniques (for example, methodologies) discussed herein may be performed. In other embodiments, the machine 700 may operate as a standalone device or may be connected (for example, networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (for example, hardware) capable of performing specified operations when operating. A module includes hardware. In an example, the hardware may be specifically configured to carry out a specific operation (for example, hardwired). In another example, the hardware may include configurable execution units (for example, transistors, circuits, etc.) and a computer readable medium containing instructions where the instructions configure the execution units to carry out a specific operation in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (for example, computer system) 700 may include a plurality of hardware processors 702 including a central processing unit (CPU) 792 and a graphics processing unit (GPU) 794, a main memory 704 and a static memory 706, some or all of which may communicate with each other via an interlink (for example, bus) 708. The machine 700 may further include a power management device 732, a graphics display device 710, an alphanumeric input device 712 (for example, a keyboard), and a user interface (UI) navigation device 714 (for example, a mouse). In an example, the graphics display device 710, alphanumeric input device 712, and UI navigation device 714 may be a touch screen display. The machine 700 may additionally include a storage device (i.e., drive unit) 716, a network interface device/transceiver 720. The machine 700 may include an output controller 734, such as a serial (for example, universal serial bus (USB), parallel, or other wired or wireless (for example, infrared (IR), near field communication (NFC), etc.) connection to communicate with or control one or more peripheral devices (for example, a printer, card reader, etc.)).

The storage device 716 may include a machine readable medium 722 on which is stored one or more sets of data structures or instructions 724 (for example, software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

Hardware processors 702 may comprise one or more silicon based circuits that may perform operations commensurate with methods 200, 300, 400, and 500.

For example, the CPU 792 for may execute computer-executable instructions that cause the CPU 792 to send one or more instructions to GPU 794 to execute one or more of steps 202-206 inclusive of the subroutines in step 202 (steps in FIGS. 3-5).

The instructions 724 may carry out or perform any of the operations and processes (for example, processes 200-500) described and shown above. While the machine-readable medium 722 is illustrated as a single medium, the term "machine-readable medium" may include a single medium or multiple media (for example, a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more GPUs to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (for example, Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (for example, packet relay, internet protocol (IP), transmission control protocol (TCP), user datagram protocol (UDP), hypertext transfer protocol (HTTP), etc.). Example communications networks may include a local area network (LAN), a wide area network (WAN), a packet data network (for example, the Internet), mobile telephone networks (for example, cellular networks), Plain Old Telephone (POTS) networks, wireless data networks (for example, (IEEE) 802.11 family of standards known as Wi-Fi®, IEEE 802.16 family of standards known as WiMAX®), IEEE 802.15.4 family of standards, and peer-to-peer (P2P) networks, among others. In an example, the network interface device/transceiver 720 may include one or more physical jacks (for example, Ethernet, coaxial, or phone jacks) or one or more antennas to connect to the communications network 726. In an example, the network interface device/transceiver 720 may include a plurality of optical communications or fiber related transceivers. The term "transmission medium" shall be taken to include any intangible medium that is capable of storing, encoding, or carrying instructions for execution by the machine 700 and includes digital or analog communications signals or other intangible media to facilitate communication of such software. The operations and processes (for example, processes 200-500) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a wireless device, a cellular telephone, a wireless telephone, a Personal Communication Systems (PCS) device, a PDA device which incorporates a wireless device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, for example, a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra-Red (IR), Frequency-Division Multiplexing (FDM), Orthogonal FDM (OFDM), time-Division Multiplexing (TDM), time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Various embodiments of the invention may be implemented fully or partially in software and/or firmware. This software and/or firmware may take the form of instructions contained in or on a non-transitory computer-readable storage medium. Those instructions may then be read and executed by one or more GPUs to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 8:
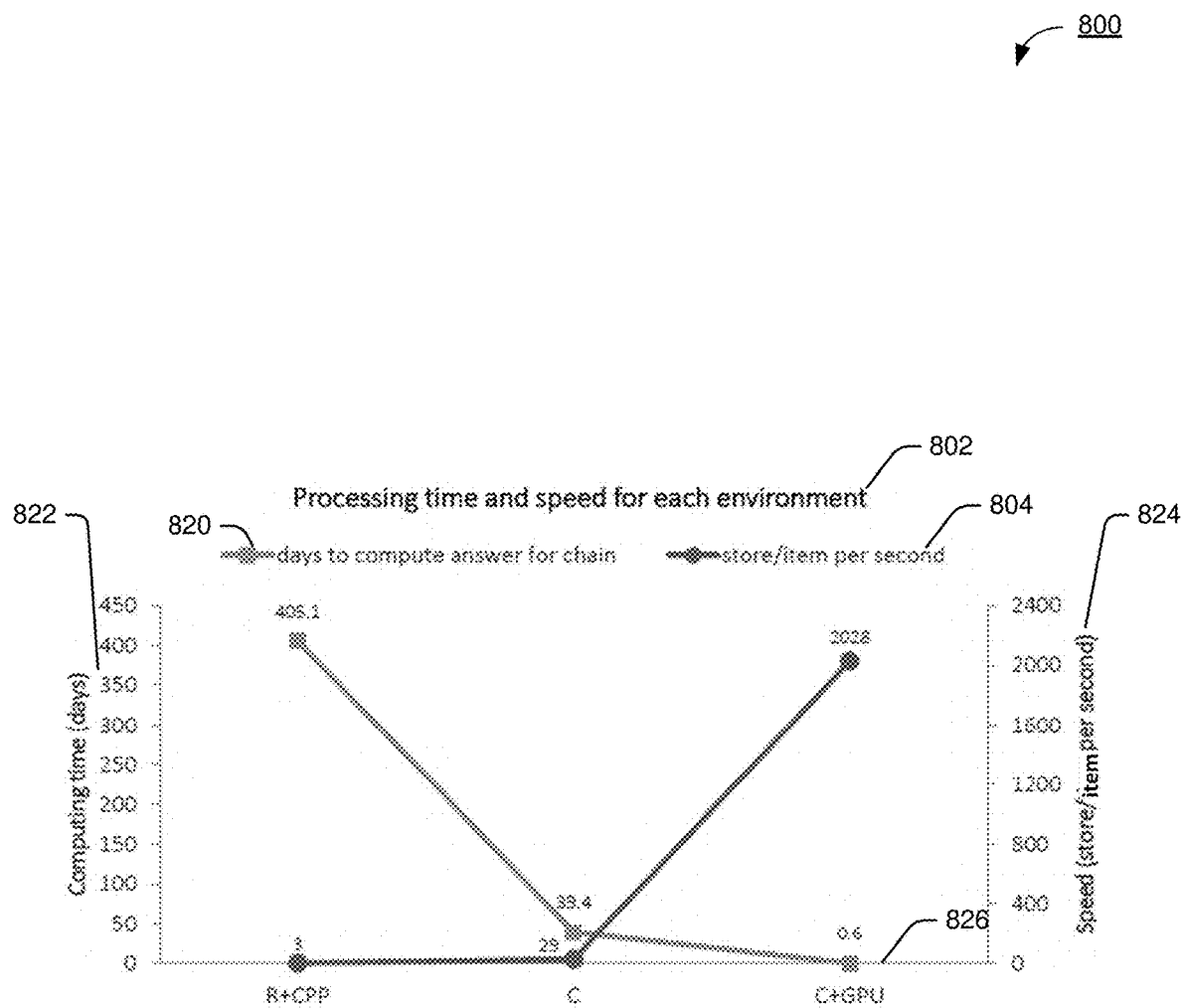
FIG. 8 is an exemplary graph illustrating an exemplary performance of exemplary embodiments disclosed herein.

FIG. 8 is an exemplary graph illustrating performance of a graphics processing unit (GPU), according to the exemplary embodiments disclosed herein. As mentioned above, the GPU is specifically constructed and programmed with one or more modules capable of parallel computing and multithreading in order to determine the number of items are needed at a store to meet a forecasted demand. Processing time and speed for each environment 802 depicts performance characteristics associated with determining an inventory management setting for different computing architectures as explained below.

As a non-limiting example, axis 826 represents the different computing architectures that may be used to compute an inventory management setting, e.g. a safety stock setting. For example one computing architecture may be a CPU executing a program for determining the safety stock setting written in the programming languages R and C++. Another computing architecture may be a CPU executing a program for determining the safety stock setting written in the programming language C. Yet another computing architecture may be an embodiment of the specifically programmed GPU executing a an embodiment of the present disclosure in the programming language C. Axis 822 may represent the computing time for a computing architecture to determine the safety stock setting. Axis 822 may be expressed in days. Axis 824 may represent the number of stores per item per second that the safety stock setting can be determined for.

Days to compute answer to chain 820 represents the number of days that it takes to determine the safety stock setting for items across all stores. For instance, the computing architecture with a CPU executing a program for determining the safety stock setting written in R and C++ will take the CPU 405.1 days to compute the safety stock setting. For the computing architecture with a CPU executing a program for determining the safety stock setting written in C will take the CPU 39. 4 days to compute the safety stock setting. For the computing architecture with a GPU executing a program for determining the safety stock setting written in C, it will take the GPU 14.4 hours (0.6×24 hours) to determine the safety stock setting.

Store per item per second (store/item per second 804) represents the number of stores per item per second that the safety stock setting can be computed. For the computing architecture with a CPU executing a program for determining the safety stock setting written in R and C++ the CPU may only determine the safety stock setting for 3 stores for a given item in one second. For, the computing architecture with a CPU executing a program for determining the safety stock setting written in C, the CPU may only determine the safety stock setting for 29 stores for a given item in one second. However, for the computing architecture with the specifically designed and programmed CPU disclosed herein executing a program for determining the safety stock setting, the specifically designed and programmed GPU may determine the safety stock setting for 2028 stores for a given item per second.

In some example embodiments, of this disclosure, there may be a system comprising: a database storing a history of a variability of a demand for one or more products at a store, a central processing unit, and a graphics processing unit. The central processing unit may be configured to: receive data associated with a historical distribution of a variability of a demand for one or more products at a store; and submit the data associated with the historical distribution of the variability of the demand to the graphics processing unit. The graphics processing unit may be specifically programmed to: generate a sample path for the demand of the one or more products at the store based at least in part on the data associated with the historical distribution of the variability of the demand of the one or more products, wherein the sample path comprises a plurality of scenarios based on a negative binomial distribution associated with the data; generate a thread corresponding to each of the scenarios; execute each thread in parallel to determine one or more parameters for each of the plurality of scenarios for the one or more products; select the one or more parameters generated from the execution of one of the sample paths to minimize the cost; and adjust an inventory management system to set a safety stock setting based at least in part on the selection of the one or more parameters.

In some embodiments, the central processing unit may be further configured to execute the computer-executable instructions to determine an inventory level of the one or more products based at least in part on an inventory level of the one or more products at a first time, an amount of the one or more products ordered at the first time, and the sample path for the demand of the one or more products.

Further still in other embodiments, the central processing unit may be further configured to execute the computer-executable instructions to determine a mean and a variance associated with the negative binomial distribution based at least in part on a sample mean of the historical distribution of the variability of the demand for the one or more products and a sample variance of the historical distribution of the variability of the demand for the one or more products.

In some embodiments, the cost associated with the one or more products may comprise a holding cost and loss of sales cost.

In some embodiments, the central processing unit may be further configured to execute the computer-executable instructions to determine the safety stock setting based on a minimum of the sum of the holding cost and the loss of sales cost.

In some embodiments, the holding cost may be based at least in part on a total on-hand inventory quantity, an ending inventory, an inbound shipment quantity, and a quantity of the demand of the one or more products.

Yet in still in other embodiments, the loss of sales cost may be based at least in part on a cost of at least one of the one or more products multiplied by a number of units of the at least one of the one or more products that are unavailable for sale.

What is claimed is:
1. A system comprising:
a database storing a history of a variability of a demand for one or more products at a store;

a central processing unit programmed to:
receive data associated with a historical distribution of a variability of a demand for one or more products at a store; and
submit the data associated with the historical distribution of the variability of the demand to a graphics processing unit;
the graphics processing unit being programmed to:
generate a sample path for the demand of the one or more products at the store based at least in part on the data associated with the historical distribution of the variability of the demand of the one or more products, wherein the sample path comprises a plurality of scenarios based on a negative binomial distribution associated with the data;
generate a thread corresponding to each of the scenarios;
execute each thread in parallel to determine one or more parameters for each of the plurality of scenarios for the one or more products;
select the one or more parameters generated from the execution of one of the sample paths to minimize the cost; and
adjust an inventory management system to set an inventory management setting based at least in part on the selection of the one or more parameters.

2. The system of claim 1, wherein the central processing unit is further configured to execute the computer-executable instructions to:
determine an inventory level of the one or more products based at least in part on an inventory level of the one or more products at a first time, an amount of the one or more products ordered at the first time, and the sample path for the demand of the one or more products.

3. The system of claim 1, wherein the central processing unit is further configured to execute the computer-executable instructions to:
determine a mean and a variance associated with the negative binomial distribution based at least in part on a sample mean of the historical distribution of the variability of the demand for the one or more products and a sample variance of the historical distribution of the variability of the demand for the one or more products.

4. The system of claim 1, wherein the cost associated with the one or more products comprises a holding cost and loss of sales cost.

5. The system of claim 4, wherein the central processing unit is further configured to execute the computer-executable instructions to:
determine the inventory management setting based on a minimum of the sum of the holding cost and the loss of sales cost.

6. The system of claim 4, wherein the holding cost is based at least in part on a total on-hand inventory quantity, an ending inventory, an inbound shipment quantity, and a quantity of the demand of the one or more products.

7. The system of claim 4, wherein the loss of sales cost is based at least in part on a cost of at least one of the one or more products multiplied by a number of units of the at least one of the one or more products that are unavailable for sale.

8. A non-transitory computer-readable medium storing computer-executable instructions stored therein, which when executed by at least one processor, cause the at least one processor to perform the operations of:
receiving data associated with a historical distribution of a variability of a demand for one or more products at a store;
generating a sample path for the demand of the one or more products at the store based at least in part on the data associated with the historical distribution of the variability of the demand of the one or more products, wherein the sample path comprises a plurality of scenarios based on a negative binomial distribution associated with the data;
generating a thread corresponding to each of the plurality of scenarios;
processing each of the threads in parallel to determine an inventory level of the one or more products, a number of orders for the one or more products, and a cost associated with the one or more products for each of the plurality of scenarios using a parallel process; and
selecting the one or more parameters generated from the execution of one of the sample paths to minimize the cost;
adjusting an inventory management system to set an inventory management setting based at least in part on the selection of the one or more parameters.

9. The non-transitory computer-readable medium of claim 8, wherein the computer-executable instructions further cause the at least one processor to perform the operations of:
determining the inventory level of the one or more products based at least in part on the inventory level of the one or more products at a first time, an amount of the one or more products ordered at a first time, and the sample path for the demand of the one or more products.

10. The non-transitory computer-readable medium of claim 8, wherein the computer-executable instructions further cause the at least one processor to perform the operations of:
determining a mean and a variance associated with the negative binomial distribution based at least in part on a sample mean of the historical distribution of the variability of the demand for the one or more products and a sample variance of the historical distribution of the variability of the demand for the one or more products.

11. The non-transitory computer-readable medium of claim 8, wherein the cost associated with the one or more products comprises a holding cost and loss of sales cost.

12. The non-transitory computer-readable medium of claim 11, wherein the computer-executable instructions further cause the at least one processor to perform the operations of:
determining the inventory management setting based on a minimum of the sum of the holding cost and the loss of sales cost.

13. The non-transitory computer-readable medium of claim 12, wherein the holding cost is based at least in part on a total on-hand inventory quantity, an ending inventory, an inbound shipment quantity, and a quantity of the demand of the one or more products.

14. The non-transitory computer-readable medium of claim 13, wherein the loss of sales cost is based at least in part on a cost of at least one of the one or more products multiplied by a number of units of the at least one of the one or more products that are unavailable for sale.

15. A method for determining an inventory management setting for one or more products at a store comprising:
- receiving data associated with a historical distribution of a variability of a demand for one or more products at a store via a central processing unit;
- submitting the data associated with a historical distribution of a variability of a demand to a graphics processing unit;
- generating a sample path for the demand of the one or more products at the store by the graphics processing unit based at least in part on the data associated with the historical distribution of the variability of the demand of the one or more products, wherein the sample path comprises a plurality of scenarios based on a negative binomial distribution associated with the data;
- generating, via the graphics processing unit, a thread corresponding to each of the scenarios;
- executing, via the graphics processing unit, each thread in parallel to determine one or more parameters associated with the one or more products for each of the plurality of scenarios; and
- selecting the one or more parameters generated from the execution of one of the sample paths to minimize the cost;
- adjusting an inventory management system to set an inventory management setting based at least in part on the selection of the one or more parameters.

16. The method of claim 15, the method further comprising:
- determining an inventory level of the one or more products based at least in part on an inventory level of the one or more products at a first time, an amount of the one or more products ordered at a first time, and the sample path for the demand of the one or more products.

17. The method of claim 15, the method further comprising:
- determining a mean and a variance associated with the binomial distribution based at least in part on a sample mean of the historical distribution of the variability of the demand for the one or more products and a sample variance of the historical distribution of the variability of the demand for the one or more products.

18. The method of claim 15, wherein the cost associated with the one or more products comprises a holding cost and loss of sales cost.

19. The method of claim 18, the method further comprising:
- determining the inventory management setting based on a minimum of the sum of the holding cost and the loss of sales cost.

20. The method of claim 18, wherein the holding cost is based at least in part on a total on-hand inventory quantity, an ending inventory, an inbound shipment quantity, and a quantity of the demand of the one or more products.

* * * * *

UNITED STATES PATENT AND TRADEMARK OFFICE
CERTIFICATE OF CORRECTION

PATENT NO. : 11,348,047 B2
APPLICATION NO. : 16/906981
DATED : May 31, 2022
INVENTOR(S) : Shuohao Wu et al.

Page 1 of 1

It is certified that error appears in the above-identified patent and that said Letters Patent is hereby corrected as shown below:

On the Title Page

Column 1, (72) Inventors, Line 3, delete "San Jose," and insert -- Sunnyvale, --, therefor.

Column 2, Other Publications, Line 1, delete "G" and insert -- G. --, therefor.

In the Claims

Claim 13, Column 2, Line 59, delete "claim 12" and insert -- claim 11 --, therefor.

Signed and Sealed this
Twenty-second Day of November, 2022

Katherine Kelly Vidal
*Director of the United States Patent and Trademark Office*